W. E. Smith,
Model for Cutting Dresses.

No. 101,390.      Patented Mar. 29, 1870.

Witnesses,
E. A. West
E. B. Sherman

Inventor,
William E. Smith

United States Patent Office.

WILLIAM E. SMITH, OF CHICAGO, ILLINOIS.

Letters Patent No. 101,390, dated March 29, 1870.

---

IMPROVED GRADUATED RULE AND PATTERN FOR TAILORS.

---

The Schedule referred to in these Letters Patent and making part of the same.

---

Be it known that I, WILLIAM E. SMITH, of Wheaton, State of Illinois, have invented a new and improved Graduated Rule for cutting ladies' and children's Dresses, Basques, and Sacks; and I hereby declare that the following is a true, full, and exact description thereof, reference being had to the accompanying drawings making part of this specification, in which—

The object of my invention is to provide a single rule by the use of which dresses may be accurately cut out, and all of the curved lines be marked.

To enable others skilled in the art to make and use my invention, I proceed to describe the construction and operation of the same.

I call the narrow end of the rule the upper end, and it is sufficiently wide to lay off thereon the neck of the dress.

The dotted curved line F E indicates the small neck size, and the dotted curved line F G indicates the large neck size.

On the straight edge of the rule are the graduated scales B and A. The scale B extends six inches below the small neck size, and is divided into twenty-four equal parts, numbered from 18 to 42. This scale is used for getting the size of the bottom part d, fig. 2, of the front of the waist.

Figure 3:
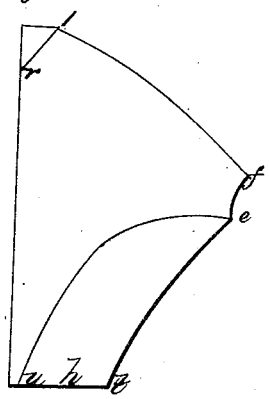
Figures 2 and 3 are no part of my system, but are used for the purpose of facilitating the description of the mode of using the invention, these two figures representing dress-patterns which may be cut by my system.
Figure 1:
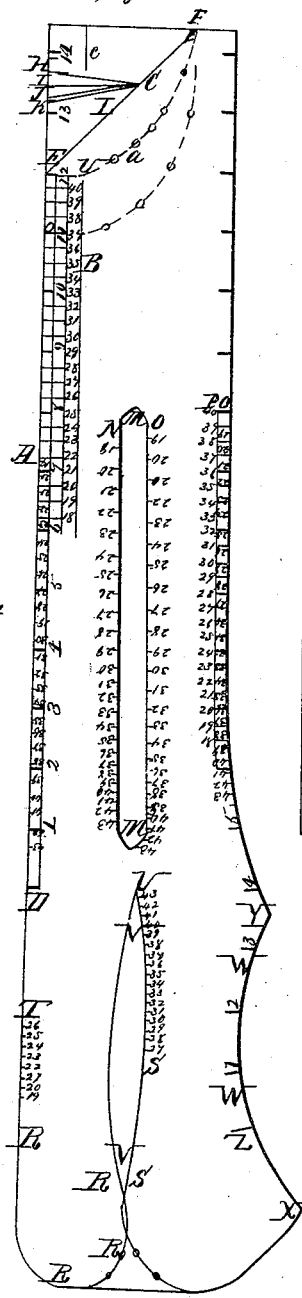
Figure 1 represents the rule.

The scale A commences four and three-fourths inches from the point E, and extends seven inches, and is divided into twenty-three parts, and is used to find the lower part e, fig. 3, of the arm size in the back piece.

The point C is situated in the center of the rule near the upper end, and from this point the diverging lines H I J K are drawn.

L is a straight line drawn from the upper point of the neck size F to the lower point of the neck size E, the use of which will be hereafter mentioned.

In the center of the rule is an elongated opening, M M, having on each side of it graduated scales N and O. The scale N gives the distance from the center point C to a point in the back of the dress indicated by f in fig. 3, and being the upper point of that part of the arm-hole formed by the back.

Figure 2:
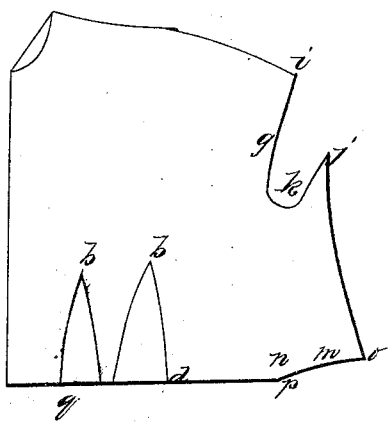

The scale O is on the right side of the opening M M, and gives the distance from the center point C to the point g, fig. 2, of the front arm size.

On the right side of the rule, and near the center thereof, are the scales P and Q.

The scale P is divided into twenty-two parts, and is used to find the size of the bottom h, fig. 3, of the back.

The scale Q is divided into twenty-three parts, and is used to get the distance from the center point C to the upper point i, fig. 2, of the front arm size.

At the lower end of the rule is another oblong opening V V, with the scale U on the right side of this opening, and the corresponding portion of the lower end of the rule is used to form the large arm size, and a small arm size, R, with a scale, T, is formed upon the left of the lower end. The scales U and T give the length of the arm size.

To illustrate the working of this rule, I will suppose the measurement of a lady to be—chest thirty-four inches, waist twenty-five inches, and length of waist eighteen inches; the measurement being taken in the usual manner; first, around the chest, drawing quite snug; second, from the point under the arm down to the natural waist; third, around the waist.

To cut the front, first lay the straight edge of the rule, face up, on the straight edge of the cloth, after turning in one and one-half inch for hooks and eyes; then make a dot at the points E and F, and dot the line a; then connect the points E and F by a straight line, L. Then insert a pin into the center point C, and into the dot made at F on the cloth; then turn the rule upon the pin until the diverging line H comes over the line L, and make a dot on the cloth at scale A at 34; then turn the rule again until the diverging line I comes over the line L on the cloth, and make a dot at 34 in scale O. Then turn the rule face down, with the point Y at the first dot made at 34, i, fig. 2, and draw a line at the edge of the rule to point F, which forms the shoulder. Then turn the rule face up, and place 34 in scale U, at the first dot made at 34, i, fig. 2, the edge of the oblong opening V passing through the second dot made at 34, g, fig. 2; then draw a line, from i to j, fig. 2, being around the large arm size S to the point X in the rule. Then measure eight inches down from the lowest part, k, fig. 2, of the arm size S, and make a dot, m. Then place the point Z in scale W, even with the front edge of the cloth, and the edge of the opening M, on which is the scale O, even with the lowest part k, fig. 2, of the arm size; then make points at figs. 4 and 7 for the top points of the darts l l, fig. 2. The location of the darts depends on the size of the person. Then move the rule down to the point made, eight inches below the arm size, and make two points, one two inches and the other four inches from the edge of the cloth, for the bottom of the first dart. Then place the rule face down, with the point Y over the point made for the top of the first dart, and the edge of the rule over the left hand dot at the bottom of the first dart, and draw a line connecting the two points. Then turn the rule face up, with the point Y at the point made for the top of the first dart, and the edge of the rule over the right-hand dot for the bottom of the first dart, and draw a line connecting these points and you have the first dart. Then make two points at the right of the first dart, one being one-half inch from the same, the other three inches from the same, these points being made for the bottom of the second dart; then proceed as in marking the first dart, and you have the second dart. Then place the straight edge of the rule, face up, over the dot $m$, fig. 2, with the inch mark D even with the front edge of the cloth, and make a dot, $n$, fig. 2, in scale B at 25, (the measurement around the waist); then make a dot, $o$, fig. 2, four and one-half inches (the amount taken up by the darts) from the last dot $n$. Then place the face of the rule down, with point Y over the point $j$, fig. 2, and the other end over the dot $o$ made for the back part of the front, and draw a curve line connecting the two points for the back of the front. Then make a point, $p$, fig. 2, one-half inch below the point $n$, turn the rule face down, and place the point Y on the dot $o$, and bring the rule around to the dot $p$, and draw a line from $o$ to $p$; then make a dot, $q$, one-half inch below the first dart, and draw a straight line from the dot $p$ to the front edge of the cloth, and you have the front of your waist marked.

Second, to cut the back: place the rule face up, with the line $c\,b$ over the straight edge of the cloth, and make a point, $r$, fig. 3, at $b$, and also a dot, $s$, fig. 3, at F, and draw a straight line connecting these points. Then insert a pin into the center point C and into the point made at F, turn the rule on the pin until the diverging line J comes over the straight line drawn, and make a point, $f$, fig. 3, at 34 in scale N; move the rule again on the pin until the diverging line K comes over the straight line made; then make a point, $e$, fig. 3, at 34 in scale A. Then place the rule face down, with point Y at $f$, fig. 3, and draw a line along the edge of the rule to the dot $s$ for the shoulder, turn the rule face up, with point Y at $e$, fig. 3, and draw a small curve line along the edge of the rule to the point $f$, fig. 3. Then, to find the width of the bottom of the waist, measure eight inches from the lowest point $e$, fig. 3, of the arm size obliquely down toward the left, and dot. This may not be the real point desired, but to find the desired point, place the rule face up, with fig. 4 even with the straight edge of the cloth, and make a point, $t$, fig. 3, at 25, in scale P, (the rule passing through the above supposed point,) and the point desired will be on this line eight inches from the point $e$, fig. 3. Then place the rule face down, with point Y at the dot $e$, fig. 3, of the arm size, and draw a line from this point to the point $t$, fig. 3; then draw a straight line through point $t$ at right angles with the front edge of the cloth, and you have the bottom of the back. Then make a point one-fourth inch from the front edge of the cloth on the bottom of the waist; then draw a curved line from $e$ to $u$, fig. 3, the curve depending on the shape of the person to be fitted, and this line indicates what is called the "form."

This rule may be made of sheet-metal or pasteboard, or other suitable material.

The drawings are made upon a scale of one-half inch to the inch; a full-sized rule being twenty-one inches long.

I am not aware that there is in use any pattern, rule, or scale for cutting dresses consisting of a single piece. The arrangement of the scales upon one piece or rule is convenient, and the curved lines in mine are found to be in a manner different from any other system. In actual use the rule and system have been found admirably adapted to enable even unskillful persons to fit dresses accurately.

I do not claim, broadly, cutting and fitting dresses and other garments by the use of patterns, as one system with patterns for doing this is shown in the patent to Catharine Dittenhofer, dated July 17, 1866.

Having thus fully described my invention,

What I claim as new, and desire to secure by Letters Patent, is as follows:

The within-described pattern, with its several graduated scales, slots, and curves, as shown, and for the purpose as set forth.

WILLIAM E. SMITH.

Witnesses:
 E. A. WEST,
 E. B. SHERMAN.